United States Patent [19]

Ishihara et al.

[11] Patent Number: 4,985,295
[45] Date of Patent: Jan. 15, 1991

[54] MAGNETIC RECORDING MEDIUM AND METHOD FOR PRODUCING THE SAME

[75] Inventors: Heigo Ishihara, Tokyo; Akira Osaki, Hachiouji; Waichi Nagashiro, Kanagawa; Fuzio Maeda, Odawara, all of Japan

[73] Assignee: Hitachi, Ltd., Tokyo, Japan

[21] Appl. No.: 141,423

[22] Filed: Jan. 7, 1988

[30] Foreign Application Priority Data

Jan. 23, 1987 [JP] Japan .................................. 62-12356
Feb. 5, 1987 [JP] Japan .................................. 62-23606

[51] Int. Cl.$^5$ .............................................. G11B 23/00
[52] U.S. Cl. .................................. 428/213; 428/316.6; 428/694; 428/695; 428/900
[58] Field of Search ...................... 428/316.6, 213, 694, 428/695, 900

[56] References Cited

U.S. PATENT DOCUMENTS

| | | | |
|---|---|---|---|
| 3,959,553 | 5/1976 | Hartmann et al. | 428/402 |
| 4,546,035 | 10/1985 | Ko et al. | 428/695 |
| 4,587,157 | 5/1986 | Brock et al. | 428/695 |
| 4,666,769 | 5/1987 | Miyata et al. | 428/694 |
| 4,693,908 | 9/1987 | Rossi et al. | 427/131 |

Primary Examiner—Paul J. Thibodeau
Attorney, Agent, or Firm—Antonelli, Terry, Stout & Kraus

[57] ABSTRACT

A magnetic recording medium comprising a substrate and, formed thereon, a magnetic layer comprised of magnetic particles bonded to each other with a thermosetting binder can be improved with respect to the durability by forming a number of fine pores in the magnetic layer and impregnating the fine pores with a lubricant. Particularly, when the fine pores have a diameter of 0.2 μm or less and a rate of the fine pore in area of 3 to 30%, the durability can be improved while maintaining the noise during the recording and reproduction of information on a low level. In preparing the magnetic recording medium having such fine pores, it is preferred that an easily thermal-decomposable additive, such as polyalkylene oxide, be added to a magnetic layer forming paint.

A magnetic recording medium having further improved characteristics can be produced by interposing an undercoating layer having a number of fine pores between the magnetic layer and the substrate, allowing the fine pores in the undercoating layer to communicate with the fine pores with a lubricant. In this case, in forming the fine pores, it is preferable to add an easily thermal-decomposable additive to a paint or extract a thermoplastic resin from a layer containing the thermoplastic resin with a solvent.

10 Claims, 1 Drawing Sheet

MAGNETIC RECORDING MEDIUM AND METHOD FOR PRODUCING THE SAME

BACKGROUND OF THE INVENTION

This invention relates to a magnetic recording medium and a method for producing the same. More particularly, the present invention is concerned with a magnetic recording medium suitable particularly for use in applications, such as magnetic disk devices, which is excellent in wear resistance as well as in durability and reliability, and a method for producing the same.

The magnetic recording medium for use in magnetic devices etc. generally comprises a substrate which may be of various types and a magnetic layer formed thereon. The surface of the magnetic recording medium often suffers a high-rate abrasion by a magnetic head or the like during recording and reproduction of information. The lowering in the performance of the magnetic recording medium due to the above-mentioned abrasion is now a serious problem.

Therefore, it is a common practice in the art to apply a lubricant to the surface of a magnetic layer for the purpose of protecting the magnetic layer from damages due to the abrasion with a magnetic head, etc. A preferable example of such a lubricant known in the art includes a fluorinated oil, such as perfluoropolyether, as disclosed in U.S. Pat. No. 3,778,308. A currently important task is to provide a method for suitably utilizing this type of substance having a lubricity as a lubricant for a magnetic recording medium.

When the above-mentioned lubricant is applied to a magnetic recording medium, such as a magnetic disk, the greater the amount of the lubricant, the more improved the durability of the magnetic recording medium. However, excessive application of the lubricant to the surface of the magnetic layer causes an increase in the adhesion force between the head and the surface of the magnetic recording medium when the magnetic disk device is stopped, which raises problems that the head or the surface of the magnetic recording medium is damaged when the device is restarted or, in an extreme case, the device cannot be driven at all. As mentioned above, the adhesion force between the head and the medium is affected by the amount of the lubricant which is present on the surface of the medium. Hitherto, various proposals have been made with respect to a method for properly controlling the amount of the lubricant applied onto the surface of the magnetic layer which comprises rendering the magnetic layer porous and impregnating the porous layer with a lubricant.

Examples of such proposals include a magnetic disk comprising a porous magnetic layer composed of magnetic particles, a thermosetting resin of epoxyphenol resin system and non-magnetic, inorganic particles, which layer was impregnated with a lubricant (see Japanese Patent Laid-Open No. 104202/1978) and a method of preparing a porous magnetic layer which comprises adding an organic additive, such as liquid paraffin, to a magnetic paint and thermally decomposing and evaporating the additive when a coating film formed is cured (see Japanese Patent Laid-Open Nos. 3435/1981 and 10419/1985).

Further, in recent years, a proposal has been made on a high-density magnetic recording medium comprising a thermoplastic resin suitable for use in floppy disks etc., wherein an undercoating layer containing a lubricant is provided (see Japanese Patent Laid-Open No. 73235/1986).

Among the above-mentioned prior art, the method which comprises rendering a magnetic layer porous and impregnating the porous layer with a lubricant is free from a problem with respect to the lack of the lubricant, because in the conventional magnetic recording medium having a low recording density and a thick magnetic layer, it is possible to impregnate the magnetic layer with a sufficient amount of a lubricant. However, with respect to a magnetic recording medium having a high recording density for which there is an ever-increasing demand on a decrease in the thickness of the magnetic layer, it is necessary to increase the porosity of the magnetic layer in order to impregnate a thin magnetic layer with a sufficient amount of a lubricant. This leads to a problem with respect to the durability of the magnetic recording medium, such as a remarkable lowering in the wear resistance of the magnetic layer.

On the other hand, the above-mentioned prior art method which comprises adding non-magnetic particles to a magnetic coating film raises problems such as an increase in the noise output due to the additive. Moreover, the above-mentioned prior art method which comprises making a porous structure through thermal decomposition of an organic additive is disadvantageous in that a failure to choose a proper additive having a desirable compatibility with the binder of the paint leads to the formation of large pores in the coating film, thus causing noises and errors.

Furthermore, among the above-mentioned prior art methods, the method in which a lubricant is incorporated in an undercoating layer provides a structure suited for a high-density magnetic recording medium having a thin magnetic layer. However, in this method, the positions of the fine pores of the undercoating layer do not- always coincide with those of the magnetic layer and, therefore, the fine pores of the undercoating layer do not get through to the surface of the magnetic layer, which makes it impossible to impregnate the undercoating layer with a sufficient amount of a lubricant. Particularly, with respect to a magnetic disk comprising a magnetic layer composed of a thermosetting resin suited for a rigid disk, it is very difficult to impregnate the undercoating layer with a lubricant, because the thermosetting resin of the magnetic layer is very closely hardened.

DESCRIPTION OF THE INVENTION

An object of the present invention is to provide a magnetic recording medium having an excellent wear resistance, an improved durability and a high reliability, said medium being impregnated with a large amount of a lubricant without spoiling the magnetic characteristics and performance of the medium in a manner suited for a magnetic recording medium, such as a magnetic disk, and to provide a method for producing the same.

Another object of the present invention is to provide a method for producing a magnetic recording medium impregnated with a lubricant, which has a porous magnetic coating film having a large number of pores which are finer and more uniformly dispersed than those of the prior art methods by taking advantage of an additive which does not adversely affect the electric characteristics of the magnetic recording medium when it is employed in combination with a magnetic head.

The above-mentioned objects of the present invention can be attained by applying a lubricant on a magnetic recording medium comprising a substrate and, superimposed thereon in the following order, an undercoating layer having a large number of fine pores and a magnetic layer having a fine pathway for the lubricant, i.e., fine pores, which runs from a starting point of the fine pore of the undercoating layer to the surface of the magnetic layer.

The diameter of the above-mentioned fine pores is generally 5 μm or less, preferably 1 μm or less with respect to the undercoating layer and is 0.2 μm or less with respect to the magnetic layer. When the diameter of fine pores of the magnetic layer exceeds 0.2 μm, the noises and/or errors caused in the recording and reproduction thereof are unfavorably increased. In the undercoating layer, since the size of the fine pores does not directly affect the occurrence of errors, the diameter of the fine pores can be increased up to an upper limit of 5 μm, which is greater than that of the magnetic layer. When the diameter of the fine pores exceeds 5 μm, however, the uniformity of the undercoating layer is disadvantageously decreased and, therefor, the magnetic layer superimposed thereon is indirectly affected, which unfavorably leads to the occurrence of defects. It is to be noted that the foregoing description is not intended to mean that the presence of pores having a diameter larger than that mentioned above is entirely inadmissible. In the case of a magnetic device, it is well known that slight defects are admissible to a certain extent.

The rate of the fine pore in area of the magnetic layer is generally 3 to 30%, preferably 5 to 20%. When the rate is less than 3%, the amount of the impregnation with the lubricant is insufficient. On the other hand, when the rate exceeds 30%, the wear resistance of the magnetic layer is unfavorably decreased. The rate of the fine pore in area of the undercoating layer is generally 5 to 60%, preferably 10 to 30%. Since the undercoating layer does not suffer a direct abrasion, the rate of the fine pore in area can be larger than that of the magnetic layer. This enables a further increase in the amount of the impregnation with the lubricant.

In the above-mentioned range of the rate of the fine pore in area, i.e., 3 to 60%, the impregnation with a lubricant in an amount of about $2 \times 10^4$ g/m$^3$ per % of the rate can be attained. Therefore, the ranges from 3 to 30%, from 5 to 20%, from 5 to 60%, and from 10 to 30% as mentioned above with respect to the rate of the fine pore in area correspond to the amounts of the impregnation with a lubricant from $6 \times 10^4$ to $60 \times 10^4$ g/m$^3$, from $10 \times 10^4$ to $40 \times 10^4$ g/m$^3$, from $10 \times 10^4$ to $120 \times 10^4$ g/m$^3$, and from $20 \times 10^4$ to $60 \times 10^4$ g/m$^3$, respectively. These amounts of impregnation with the lubricant were calculated using a representative specific gravity of 2 which is close to the specific gravity of the lubricant generally applied to a magnetic disk, i.e., perfluoroalkylpolyether. The terminology "rate of the fine pore in area" as used in the present specification is intended to mean the total area of fine pores per unit area as viewed in a photograph or the like taken with a scanning electron microscope (SEM).

A first method of producing the magnetic recording medium according to the present invention comprises coating a substrate with a paint comprising a thermosetting resin, an easily thermal-decomposable additive having thermal decomposability greater than that of the thermosetting resin and a solvent, thereby forming an undercoating layer, and conducting primary curing of the layer at a such a temperature that the above-mentioned additive can survive. Subsequently, a magnetic layer forming paint comprising magnetic particles, a binder composed mainly of a thermosetting resin and a solvent is applied on the undercoating layer, followed by curing (second curing) of the resulting magnetic layer and the undercoating layer at a temperature higher than the primary curing temperature of the undercoating layer. During the secondary curing, the easily thermal-decomposable additive in the undercoating layer is thermally decomposed and scattered. As a result, fine pores are formed in the undercoating layer at the places where thermal decomposition of the additive has occurred, and a pathway starting from the fine pores through which a thermal decomposition product of the additive has been scattered serves as a fine pathway for the lubricant in the magnetic layer, thereby obtaining a magnetic recording medium before impregnation with a lubricant according to the present invention.

When fine pores running from the undercoating layer to the surface of the magnetic layer are formed by the thermal decomposition and scattering of the easily thermal-decomposable additive according to the above-mentioned method, the thermal decomposability characteristics of the easily thermal-decomposable additive and the compatibility of the binder of the undercoating layer composed mainly of a thermosetting resin with the additive are important. With respect to the selection of the easily thermal-decomposable additive, the following consideration must be taken into.

Specifically, since the easily thermal-decomposable additive is a source for formation of fine pores, the additive must remain in a uniformly dispersed state in the undercoating layer without causing any phase separation which is causative of a defect of the undercoating, i.e., a phase separation of a size greater than the thickness of the undercoating layer, even after evaporation of the solvent of the undercoating layer applied onto a substrate. Therefore, it is necessary that the additive have some compatibility with the binder of the undercoating layer. When the easily thermal-decomposable additive meeting the above requirements is employed, an even undercoating layer is formed, which is suited as a primary coat layer for a magnetic recording layer.

The compatibility of the easily thermal-decomposable additive will now be described in more detail.

When the solubility of the easily thermal-decomposable additive in a magnetic paint (the additive can be added also to a magnetic paint as will be described later) or in an undercoating layer is low, the number of fine pores is unfavorably decreased. Accordingly, the solubility of the easily thermal-decomposable additive in the paint is generally not lower than 5% by weight, preferably not lower than 20% by weight. There is no particular upper limit for the solubility. The most critical factor affecting the solubility of the easily thermal-decomposable additive in the paint is a solvent for the paint.

When a coating film is formed through evaporation of the solvent, the compatibility between the binder and the easily thermal-decomposable additive is important. This compatibility can be evaluated in terms of the diameter of fine pores. As mentioned before, the easily thermal-decomposable additive has a compatibility with the binder of the undercoating layer such that the undercoating layer has pores of generally 5 μm or less, preferably 1 μm or less, and a compatibility with the binder of the magnetic layer such that the magnetic layer has pores of 0.2 μm or less. When the compatibility is excellent, the diameter of the fine pores is small. On the other hand, when the compatibility is poor, the diameter of the fine pores is large.

The requirements for the thermal decomposition characteristics of the easily thermal-decomposable additive will now be described. When a magnetic layer is formed by applying a magnetic layer forming paint on an undercoating layer, it is necessary to preliminary conduct curing (primary curing) of the undercoating layer to a certain extent so that the layer is not adversely affected by the solvent of the paint. It is noted in this connection that the additive must be chosen from those capable of sufficiently surviving at the temperature of the primary curing in order to ensure an effective action of the additive. Moreover, in order to form fine pores reaching the surface of the magnetic layer by the thermal decomposition and scattering of the easily thermal-decomposable additive, it is necessary for a thermal decomposition product to occur from the additive during the curing of the magnetic layer and before the completion thereof. A typical example of the thermosetting resin employed as a binder for the magnetic layer of a magnetic disk or the like is an epoxy resin (a mixture of an epoxy resin, a phenolic resin, a vinyl resin, etc.). For example, when such a thermosetting resin is employed as a binder for the undercoating layer, curing of the binder is generally conducted at a temperature from about 170° to 250° C. Accordingly, in this case, the easily thermal-decomposable additive to be employed is chosen from the compounds which can survive without undergoing thermal decomposition at a lower temperature range such as that indicated above but are mostly thermally decomposed and scattered at a higher temperature range. A preferable substance meeting both of the above-mentioned compatibility and thermal decomposability requirements is an organic polymer having a certain compatibility with the binder. Examples of such an organic polymer include a poly(alkylene oxide). The poly(alkylene oxide) is compatible with an epoxy phenolic binder. Further, the polyalkylene oxide having a suitable molecular weight can survive by 80% or more at a lower temperature range, i.e., about 170° C. and can be thermally decomposed and scattered by 90% or more at a high temperature range, i.e., 220° to 250° C. Examples of the poly(alkylene oxide) include poly(butene oxide), poly(propylene oxide) and a copolymer thereof and a copolymer of ethylene oxide with propylene oxide.

A method for forming a magnetic recording medium according to the present invention has been described above with reference to the case where a thermosetting resin is used as a binder of the undercoating layer. However, the binder of the undercoating layer may be a resin curable with ultraviolet rays or electron beams, e.g., epoxy-acrylate resin system. In this case, the primary curing of the undercoating layer is conducted by irradiation with ultraviolet rays or electron beams, which makes it possible to cure the undercoating layer at a low temperature, thus leading to an advantage such that the loss of the easily thermal-decomposable additive at a primary curing temperature is negligible.

It is preferred that the following matter be taken into consideration in forming the magnetic recording medium of the present invention. First, with respect to the thickness of the undercoating layer, the larger the thickness, the larger the amount of impregnation with a lubricant such as perfluoroalkylpolyether. The thickness of the undercoating layer is preferably 0.5 times or more the thickness of the magnetic layer. It is noted in this connection that a thickness of 5 μm or less is preferable to obtain an even coating. With respect to the thickness of the magnetic layer, the smaller the thickness, the higher the density of magnetic recording. In the magnetic recording medium of the present invention, a suitable thickness of the magnetic layer is 0.1 to 0.8 μm. Since the shape of the surface of the undercoating layer affects the occurrence of defects of the magnetic recording medium, noises, etc., it is preferred that, if necessary, surface finishing be conducted after the primary curing of the undercoating layer to make the surface even. Further, in order to attain a useful effect of the easily thermal-decomposable additive contained in the undercoating layer, it is preferable to suppress the shrinkage on curing of the undercoating layer during the thermal decomposition and scattering of the thermal-decomposable additive. An effective expedient for attaining this purpose is to incorporate non-magnetic particles, such as $\alpha$-$Fe_2O_3$, $SiO_2$, $Al_2O_3$, $SiC$, $ZrO_2$, or polymer particles, in the undercoating layer. The amount of addition of the non-magnetic particles is preferably 65% by volume or less based on the binder of the undercoating layer (total amount of the binder and the particles: 100% by volume). Magnetic particles, such as $\gamma$-$Fe_2O_3$, iron powder, $\gamma$-$Fe_2O_3$ containing cobalt, $Fe_3O_4$, $Fe_3O_4$ containing cobalt, or barium ferrite, may be also added in order to improve the magnetic characteristics of the magnetic recording medium through the impartment of the capacity for impregnation with a lubricant and magnetism to the undercoating layer. The amount of addition of the magnetic particles is preferably 65% by volume or less based on the binder of the undercoating the (total amount of the binder and the particles: 100% by volume).

The preferable diameter of the above-mentioned non-magnetic particles is less than twice the thickness of the under coating layer. It is unfavorable for the particle diameter of the non-magnetic particles contained in the undercoating layer to exceed this value, because there occurs defects when the particles are protruded into the magnetic layer. Although there is no particular restriction with respect to the lower limit of the particle diameter, the particle diameter of the non-magnetic particles obtained by current techniques is generally 0.02 μm or more.

Since the above-mentioned magnetic particles incorporated in the undercoating layer is related to the magnetic characteristics of the magnetic recording medium, it is preferred that the particle diameter of the magnetic particles be substantially the same as that of the magnetic particles used in the magnetic film of an ordinary recording medium, i.e., 0.5 μm to 0.02 μm.

In the magnetic layer applied on the undercoating layer, a fine pathway for a lubricant is formed through the thermal decomposition and scattering of the easily thermal-decomposable additive contained in the undercoating layer even when it is free from any thermal-decomposable additive. However, the addition of the thermal-decomposable additive to a magnetic layer forming paint leads to more effective formation of the fine pathway. In this case, the thermal-decomposable additive added to the undercoating layer may different from that added to the magnetic layer forming paint.

The amount of addition of the easily thermal-decomposable additive to the undercoating layer is 5 to 60% by weight based on the binder (total amount of the binder and the additive: 100% by weight), preferably 10 to 50% by weight. When the amount of addition of the thermal-decomposable additive is below the above-mentioned range, any sufficient impregnation with the lubricant cannot be attained. On the other hand, when the amount of addition exceeds the above-mentioned range, the wear resistance of the undercoating layer is lowered, which unfavorably makes it difficult to conduct surface finishing.

When an easily thermal-decomposable additive is added to the magnetic layer forming paint, the amount of addition of the thermal-decomposable additive is 30% by weight or less based on the binder (the total amount of the binder and the additive: 100% by weight), preferably 5 to 30% by weight. The addition in an amount exceeding 30% by weight unfavorably brings about not only an increase in noises during the recording and reproduction of information with respect to the magnetic recording medium but also a lowering in the wear resistance. An apparent effect derived from the addition of the thermal-decomposable additive to the magnetic paint can be attained when the amount of addition is 5% by weight or more.

It is needless to say that, in the magnetic recording medium of the present invention, the binder for the thermosetting resin used in the formation of the magnetic layer may be the same as or different from the binder used in the formation of the undercoating layer.

A second method for producing the magnetic recording medium according to the present invention comprises coating a substrate with a paint containing a binder, such as the same thermosetting resin as that used in the above-mentioned first method, an ultraviolet-curable resin and an electron beam-curable resin, a thermoplastic resin compatible with said binder, and a solvent to thereby form an undercoating layer, subjecting said undercoating layer to primary curing by heating, ultraviolet radiation or electron beam radiation at such a temperature that said thermoplastic resin can survive without undergoing evaporation or thermal decomposition, coating said undercoating layer which has been subjected to primary curing with a magnetic layer forming paint containing magnetic particles, a thermosetting resin and a solvent, thereby forming a magnetic layer, subjecting said magnetic layer and said undercoating layer to secondary curing at such a temperature that said thermosetting resin of said magnetic layer is incompletely cured and said thermoplastic resin contained in said undercoating layer can survive, immersing said substrate having said incompletely cured undercoating and said magnetic layer formed thereon in a solvent capable of dissolving said thermoplastic resin contained in said undercoating layer to extract and remove said thermoplastic resin from said undercoating layer through said incompletely cured magnetic layer, and subjecting said undercoating layer and said magnetic layer to tertiary curing at such a temperature that said heat curable binder contained in said undercoating layer and said magnetic layer is completely cured, thereby forming fine pores in said undercoating layer and, at the same time, forming a fine pathway in said undercoating layer which reaches the surface of said magnetic layer. In the above-mentioned second method according to the present invention, an alcoholic solvent, such as methyl alcohol, or an ethereal solvent, such as ether, may be used as the solvent for removing the thermoplastic resin from the undercoating layer. Further, in the second method according to the present invention, the thermoplastic resin used in the undercoating layer may be the same substance as the easily thermal decomposable additive used in the above-mentioned first method according to the present invention and includes poly(alkylene oxide), and other conditions of production may be substantially the same as those employed in the first method according to the present invention.

In this second method as well, the fine pathway can be more effectively formed by the addition of a fine pore forming resin, i.e., a thermoplastic resin in this case, to the magnetic resin as mentioned with respect to the first method.

The amount of the thermoplastic resin to be added to the undercoating layer and the magnetic layer forming paint is the same as that of addition of the easily thermal decomposable additive in the above-mentioned first method. In both the first and second methods, any magnetic paint known in the art may be used, except that an easily thermal-decomposable additive or a thermoplastic resin is added thereto according to need.

Further, the second method is the same as the first method, except that a thermoplastic resin is added instead of the thermal-decomposable additive and the thermoplastic resin is extracted and removed when the thermosetting resin is in an incompletely cured state.

In both the first and second methods, the magnetic recording medium of the present invention can be obtained by impregnating a dual layer comprising the magnetic layer and the undercoating layer with a lubricant from the surface of the magnetic layer after the formation of the magnetic layer. As mentioned above, a fluorinated oil, such as perfluoropolyether, is preferably used as the lubricant.

In the magnetic recording medium of the present invention, a number of fine pores constituting a fine pathway which runs from the fine pores of the undercoating layer as the starting point to the surface of the magnetic layer are formed within the undercoating layer. Therefore, the application of the lubricant on the surface of the magnetic layer causes an impregnation of the undercoating with a large amount of lubricant, which enables the formation of a magnetic recording medium having wear resistance and durability superior to the conventional magnetic recording medium.

The above-mentioned poly(alkylene oxide) exhibits an excellent effect when it is used in forming pores in a magnetic layer containing a thermosetting resin as a binder. Therefore, in the production of a magnetic recording medium in which a magnetic layer is directly provided on a substrate free from the undercoating layer, a lubricant-impregnated magnetic recording medium provided with a porous magnetic coating film having fine pores which are finer and more uniformly dispersed than the fine pores in the conventional magnetic recording medium can be obtained by adding a poly(alkylene oxide) to the magnetic paint and thermally decomposing the polyalkylene oxide during the curing of the magnetic coating film to form a number of fine pores in the magnetic coating film. These fine pores reach the surface of the magnetic coating film. The magnetic recording medium thus obtained can be impregnated with a lubricant in an amount larger than that of impregnation with a lubricant in the case of the conventional lubricant-impregnated magnetic recording medium without causing any increase in noises and errors. The method for producing this kind of magnetic recording medium will now be described.

This magnetic recording medium can be produced by a method which comprises adding a poly(alkylene oxide) which is a polymer compatible with a binder and having a thermal decomposition temperature which is substantially the same as or lower than the curing temperature of the binder and forming a coating on a substrate by making use of the magnetic paint and heat treating the coating to cure the binder and, at the same time, to thermally decompose and evaporate the poly(alkylene oxide).

As mentioned above, when fine pores are formed in the magnetic film through the thermal decomposition and evaporation of the additive, the thermal decomposability of the additive and the compatibility of the additive with the binder are critical.

The poly(alkylene oxide) which is an additive used in the present invention is a polymer having an ether linkage in its main chain. The thermogravimetric analysis (TGA) revealed that this substance has a thermal decomposition temperature higher than that of a substance free from an ether linkage, e.g., liquid paraffin, polyethylene, or polybutene, and causes rapid thermal decomposition at about 180° to 230° C.

Further, the poly(alkylene oxide) exhibits excellent compatibility with the binder of the magnetic paint. For example, a binder composed mainly of an epoxy resin or a phenolic resin (50% by weight or more) is widely used as a heat-curable binder for a magnetic coating film of a magnetic disk or the like. The poly(alkylene oxide) exhibits excellent compatibility with these resins. In this case, the compatibility varies depending upon the proportion of the either linkage in the poly(alkylene oxide). Polymers of propylene oxide, butene oxide, and heptene oxide, or copolymers comprising these polymers as main component (30% by weight or more) and other alkylene oxides exhibit particularly excellent compatibility.

Since the additive according to the present invention has excellent compatibility with the paint, it can be added in a wide range of concentration. However, when the amount of addition is too large, the diameter of the pores is large, which brings about the occurrence of noises. On the other hand, when the amount of addition is too small, fine pores in an amount sufficient for impregnation with a lubricant cannot be formed. For this reason, a suitable amount of addition is 1 to 30% by weight based on the binder of the magnetic paint.

The method for producing a magnetic recording medium according to the present invention may be the same as the conventional method, except that, as mentioned above, 1 to 30% by weight, based on the binder of the magnetic paint, of a poly(alkylene oxide) is added to the magnetic paint. However, for better understanding of the present invention, the method for producing a magnetic recording medium according to the present invention will be further described in comparison with the prior art.

Any thermosetting binder known in the art can be used in the present invention. Examples of such a thermosetting binder include an epoxy resin, a phenolic resin, a vinyl resin, a polyester, a cellulose derivative, a melamine resin, a polyurethane, a polyamide, an acrylic resin, a methacrylic resin or their copolymers. They may be used alone or in the form of any mixture thereof. A particularly preferable thermosetting resin is a mixture composed mainly of an epoxy resin or a phenolic resin or a mixture of both resins and other resin added thereto, such as a vinyl resin, an acrylic resin, a methacrylic resin, or a polyester.

It is preferred that the magnetic powder be used in an amount of 15 to 65% by volume. When the magnetic powder is $\gamma$-$Fe_2O_3$ (specific gravity: 5), the above-mentioned amount corresponds to about 50 to 90% by weight.

If necessary, a reinforcing agent may be incorporated in the magnetic coating film. $\alpha$-$Al_2O_3$ powder is ordinarily used as the reinforcing agent. Besides this, hard inorganic substances, such as $SiC$ or $ZrO_2$, may be also used as the reinforcing agent.

It is necessary that the magnetic coating film be cured so as to have durability sufficient to be used as a magnetic recording medium. For this reason, it is a matter of course that the heat treatment in the final step is conducted in the same manner as that of the conventional method, i.e., at such a temperature that the binder is sufficiently cured. As mentioned above, the poly(alkylene oxide) as an additive used in the present invention exhibits thermal decomposability which is in agreement with the curing temperature of the epoxy-phenolic resin, i.e., 170° to 250° C., which gives an excellent result in the above-mentioned heat treatment.

It is preferred that the thermal decomposition temperature of the poly(alkylene oxide) be substantially the same as or lower than the curing temperature of the thermosetting binder. When the additive is lost through thermal decomposition or evaporation in the step of temperature elevation (a temperature of 170° C. or below in the case of an epoxy-phenolic binder) before the initiation of the curing of the binder, formed pores disappear in the subsequent step of curing, which makes it impossible to form a porous coating film. Further, no porous coating film can be obtained when the additive does not disappear through thermal decomposition at a curing temperature of the coating film (220° to 250° C. in the case of an epoxy-phenolic binder). Therefore, it is desirable to use as the additive a polymer which can survive by 80% or more when it is heated at a temperature of about 170° C. at which the binder begins to cure and causes substantially complete thermal decomposition (90% or more) at a curing temperature of the binder, i.e., 220° to 250° C. The poly(alkylene oxide) meets this requirement and favorably causes thermal decomposition when the thermal curing proceeds to a certain extent.

After the completion of the thermal curing treatment of the magnetic layer, the magnetic layer is impregnated with a lubricant, e.g. perfluoropolyether, from the surface of the magnetic layer, thereby obtaining the magnetic recording medium of the present invention.

It is noted that the heat treatment of the magnetic layer may be conducted by a two-stage heat treatment method which comprises conducing primary curing of the magnetic coating film at about 180° C. which does not cause thermal decomposition of the poly(alkylene oxide) and then heat treating the magnetic layer at an ordinary curing temperature, i.e., about 230° C., thereby completely curing the magnetic layer and, at the same time, thermally decomposing the additive. However, a satisfactory result can be usually obtained by simply conducing the thermal decomposition at about 230° C.

The additive for the magnetic paint used in the method for producing a magnetic recording medium according to the present invention is a substance selected while sufficiently taking into consideration the compatibility with binder, thermal decomposability, etc. The formation of a coating by making use of this substance and a subsequent suitable heat treatment of the coating brings about the formation of a number of fine pores having a pore diameter as small as 0.2 μm or less, which was impossible in the prior art methods, which makes it possible to obtain a magnetic coating film impregnated with a large amount of a lubricant. In this case, the rate of the fine pore in area is 3 to 30%, preferably 5 to 20%. This enables the realization of a magnetic recording medium exhibiting reduced noises during the recording and reproduction of information and excellent durability.

DESCRIPTION OF THE PREFERRED EMBODIMENTS

Example 1

Magnetic disks in the present example and comparative examples which will be described later were prepared and evaluated by the following procedures.

3000 parts by weight of a solvent was added to a mixture comprising 600 parts by weight of magnetic powder ($\gamma$-$Fe_2O_3$), 20 parts by weight of a reinforcing agent ($\alpha$-$Al_2O_3$) and 380 parts by weight of an epoxy-phenolic binder [a mixture of 44% (by weight or by volume with similar results; the same shall apply hereinafter) of an epoxy resin, 44% of a phenolic resin, and 12% of a vinyl resin], followed by kneading with a kneader or a ball mill to obtain a magnetic layer forming paint (magnetic paint). An easily thermal-decomposable additive was added during kneading with the kneader or ball mill, or after the preparation of the magnetic paint. The solvent is a cyclohexanone/isophorone solvent prepared by mixing cyclohexanone, isophorone, and dioxane at a ratio of 6:3:1. A mixed solvent comprising cellosolve acetate and butyl cellosolve may be used as the solvent.

Undercoating layer forming paints (undercoat paint) were prepared as follows. An undercoating layer forming paint free from non-magnetic particles was prepared by adding 750 parts by weight of the same solvent as the one used above to 250 parts by weight of the same epoxy-phenolic binder as the binder of the magnetic paint, followed by mixing with an agitator. Further, an undercoating layer forming paint containing non-magnetic particles ($\alpha$-$Fe_2O_3$) in the form of needle-like powder having a major axis of 0.4 μm and a minor axis of 0.05 μm was prepared by adding 2500 parts by weight of a solvent to a mixture of 500 parts by weight of the non-magnetic particles and 500 parts by weight of an epoxy-phenolic binder, followed by kneading with a kneader or a ball mill. An easily thermal-decomposable additive was added after the completion of the preparation of the undercoating paint, followed by agitation.

Figure 1:
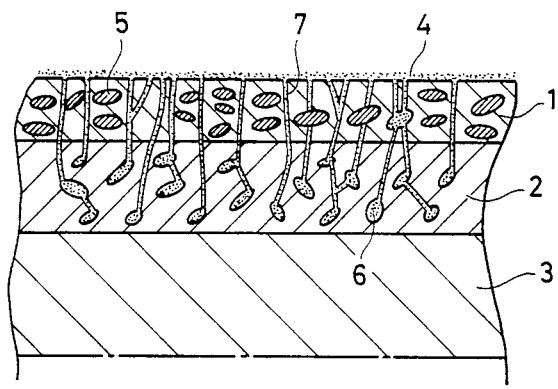
FIGS. 1 and 2 are cross-sectional views of typical examples of the magnetic recording medium of the present invention.

Magnetic disks each having a cross section as shown in FIG. 1 were prepared by making use of the paints thus obtained according to the following procedures. First, the paint for an undercoating layer was applied on a substrate 3 made of aluminum, followed by drying. The coating film of the undercoating layer thus formed was cured at 180° C. for 2 hr (primary curing) and then finished so as to have predetermined surface roughness and thickness. Then, the magnetic paint was applied on the undercoating layer 2, followed by drying. The magnetic coating film thus formed was cured together with the undercoating layer at 230° C. for 2 hr (secondary curing). Thereafter, the surface of the magnetic coating film was ground and finished to form a magnetic layer having a predetermined thickness. A predetermined amount of a lubricant (perfluoroalkylpolyether; a product of E.I. du Pont de Nemours & Co. sold under the trade name of Krytox) was applied on the surface of the magnetic layer to prepare a magnetic disk.

A magnetic disk having an undercoating layer made of an ultraviolet-curable resin was prepared in the same manner as that in the case where a thermosetting resin was used, except that, instead of forming the undercoating layer 2 with the thermosetting resin, the undercoating layer 2 was formed by making use of an undercoat paint prepared by the same method as that described above with the exception that an epoxy-acrylate resin was used as the epoxy-phenolic resin instead of the epoxy resin and that the undercoating layer was cured by irradiation with ultraviolet rays using a metal halide lamp in a nitrogen atmosphere for 5 min instead of curing at 180° C. for 2 hr (primary curing).

Further, a magnetic disk having an undercoating layer made of an electron beam-curable resin was prepared by forming an undercoating layer by making use of an epoxy-acrylate resin as an electron beam-curable resin instead of forming the undercoating layer 2 with the thermosetting resin and exposing the undercoating layer to a shower of electron beams to which a voltage of 200 kV had been applied.

The magnetic disks as prepared above each contained magnetic particles 5 in the magnetic layer 1 and had a fine pore 6 in the undercoating layer 2 and a fine pathway 7 which ran from the fine pore 6 to the surface of the magnetic layer.

The adhesion force between a magnetic head and the disk was evaluated in terms of the force applied to the head when the magnetic head was put on the surface of the disk and the disk was rotated. This adhesion force rapidly increased when the amount of the lubricant exceeded a certain value. This critical value was regarded as the amount of impregnation with the lubricant.

The test results in the present example are summarized in Table 1. As can be seen from Table 1, the magnetic disks formed by adding an easily thermal-decomposable additive to the undercoating layer, i.e., example sample Nos. 1 to 8, is apparently superior in the amount of impregnation of lubricant to the magnetic disk free from the undercoating layer (comparative example sample No. 1) or the disk which had been formed without addition of the thermal-decomposable additive to the undercoating layer (comparative example sample No. 2). Further, the following facts can be observed in Table 1. The amount of impregnation with a lubricant is increased by the addition of non-magnetic particles or magnetic particles to the undercoating layer (example sample Nos. 2 and 3). The amount of impregnation with a lubricant is further increased by addition of an easily thermal-decomposable additive to the magnetic paint (example sample No. 4). The thicker the undercoating layer, the larger the amount of impregnation with a lubricant (example sample No. 6). The same effect can be attained even when an ultraviolet-curable resin or an electron beam-curable resin is used in the undercoating layer (example sample Nos. 7 and 8).

The observations of the samples under a scanning electron microscope revealed that all of the samples obtained in the present example had a number of fine pores on the surface of the undercoating layer, said fine pores having a diameter of 5 μm or less and a rate of the fine pore in area of 5% or more and communicating with a fine pathway in the magnetic layer.

following procedures. First, the paint for forming an undercoating layer was applied on a substrate made of aluminum, followed by drying. The coating film thus formed was cured at 180° C. for 2 hr (primary curing) and then finished so as to have predetermined surface roughness and thickness. Then, the magnetic paint was applied on the undercoating layer, followed by drying.

TABLE 1

| sample No. | undercoating layer | | | magnetic layer | | amount of impregnation with lubricant (mg/m$^2$) | remarks |
|---|---|---|---|---|---|---|---|
| | coating thickness (μM) | added particles (amount of addition) | thermal-decomposable additive (amount of addition) | coating thickness (μm) | thermal-decomposable additive (amount of addition) | | |
| Ex. | | | | | | | |
| 1 | 0.5 | — | polybutene oxide (10 pts. wt.) | 0.3 | — | 162 | |
| 2 | 0.5 | αFe$_2$O$_3$ (100 pts. wt.) | polybutene oxide (10 pts. wt.) | 0.3 | — | 185 | |
| 3 | 0.5 | αFe$_2$O$_3$ (50 pts. wt.) YFe$_2$O$_3$ (50 pts. wt.) | polybutene oxide (10 pts. wt.) | 0.3 | — | 175 | |
| 4 | 0.5 | αFe$_2$O$_3$ (100 pts. wt.) | polybutene oxide (10 pts. wt.) | 0.3 | polybutene oxide (5 pts. wt.) | 227 | |
| 5 | 0.3 | αFe$_2$O$_3$ (100 pts. wt.) | polybutene oxide (10 pts. wt.) | 0.3 | polybutene oxide (5 pts. wt.) | 168 | |
| 6 | 1.0 | αFe$_2$O$_3$ (100 pts. wt.) | polybutene oxide (10 pts. wt.) | 0.3 | polybutene oxide (5 pts. wt.) | 306 | |
| 7 | 1.0 | — | polybutene oxide (10 pts. wt.) | 0.3 | — | 158 | ultraviolet-cured undercoating layer |
| 8 | 1.0 | — | polybutene oxide (10 pts. wt.) | 0.3 | — | 150 | electron beam-cured undercoating layer |
| Comp. Ex. | | | | | | | |
| 1 | — | — | — | 0.3 | — | 38 | |
| 2 | 0.5 | — | — | 0.3 | polybutene oxide (5 pts. wt.) | 85 | |

In Table 1, the amounts of addition of the added particles and the thermal-decomposable additive were expressed by parts by weight based on 100 parts by weight of the binder of the undercoating layer or the magnetic layer. "TERATHANE 2900" (the trade name of a product of E.I. du Pont de Nemours & Co.) was used as poly(butene oxide). The amount of impregnation with a lubricant was expressed in terms of the amount of deposition of the lubricant (mg) per unit surface of the magnetic disk (m$^2$).

Example 2

In the present example, a magnetic paint and an undercoat paint were prepared in substantially the same manner as in Example 1, except that a copolymer of ethylene oxide with propylene oxide was used instead of the thermal-decomposable additive as the thermoplastic resin added to the undercoating layer. Thereafter, a magnetic disk was prepared according to the The magnetic coating film thus formed was cured together with the undercoating layer at 180° C. for 2 hr (secondary curing). Thereafter, the resulting disk was immersed in methyl alcohol for 2 hr or longer, thereby extracting and removing the thermoplastic resin contained in the undercoating layer.

Then, the disk was subjected to curing at 230° C. for 2 hr. The surface of the magnetic coating film of the magnetic layer was ground and finished so as to have a predetermined thickness. A predetermined amount of a lubricant (perfluoroalkylpolyether; a product of E.I. du Pont de Nemours & Co., sold under the trade name of Krytox) was applied on the surface of the magnetic layer to prepare a magnetic disk. The amount of impregnation with a lubricant was evaluated in the same manner as in Example 1.

The test results in the present example are shown in Table 2.

TABLE 2

| sample No. | undercoating layer coating thickness (μM) | undercoating layer added particles (amount of addition) | undercoating layer thermoplastic resin (amount of addition) | magnetic layer coating thickness (μm) | magnetic layer thermoplastic resin (amount of addition) | amount of impregnation with lubricant (mg/m$^2$) | remarks |
|---|---|---|---|---|---|---|---|
| Ex. | | | | | | | |
| 9 | 0.5 | — | copolymer of ethylene oxide with propylene oxide (15 pts. wt.) | 0.3 | — | 176 | |
| 10 | 0.5 | αFe$_2$O$_3$ (100 pts. wt.) | copolymer of ethylene oxide with propylene oxide (15 pts. wt.) | 0.3 | — | 192 | |
| 11 | 0.5 | αFe$_2$O$_3$ (50 pts. wt.) YFe$_2$O$_3$ (50 pts. wt.) | copolymer of ethylene oxide with propylene oxide (15 pts. wt.) | 0.3 | — | 185 | |
| 12 | 0.5 | αFe$_2$O$_3$ (100 pts. wt.) | copolymer of ethylene oxide with propylene oxide (15 pts. wt.) | 0.3 | copolymer of ethylene oxide with propylene oxide (10 pts. wt.) | 256 | |
| 13 | 0.3 | αFe$_2$O$_3$ (100 pts. wt.) | copolymer of ethylene oxide with propylene oxide (15 pts. wt.) | 0.3 | copolymer of ethylene oxide with propylene oxide (10 pts. wt.) | 188 | |
| 14 | 1.0 | αFe$_2$O$_3$ (100 pts. wt.) | copolymer of ethylene oxide with propylene oxide (15 pts. wt.) | 0.3 | copolymer of ethylene oxide with propylene oxide (10 pts. wt.) | 298 | |
| 15 | 0.5 | — | copolymer of ethylene oxide with propylene oxide (15 pts. wt.) | 0.3 | — | 172 | ultraviolet-cured undercoating layer |
| 16 | 0.5 | — | copolymer of ethylene oxide with propylene oxide (15 pts. wt.) | 0.3 | — | 178 | electron beam-cured undercoating layer |
| Comp. Ex. | | | | | | | |
| 3 | 0 | — | — | 0.3 | — | 38 | |
| 4 | 0.5 | — | — | 0.3 | copolymer of ethylene oxide with propylene oxide (5 pts. wt.) | 85 | |

In Table 2, the amounts of addition of the added particles and the thermal-decomposable additive were expressed by parts by weight based on 100 parts by weight of the binder of the undercoating layer and the magnetic layer. "PLURONIC L121" (the trade name of a product of Asahi Denka Kogyo K.K.) was used as the copolymer of ethylene oxide with propylene oxide.

As can be seen from Table 2, the magnetic disks formed by adding a thermoplastic resin to the undercoating layer, i.e., example sample Nos. 9 to 16, is apparently superior in the amount of impregnation with a lubricant to the magnetic disk free from the undercoating layer (comparative example sample No. 3) or the disk which had been formed without addition of any thermoplastic resin to the undercoating layer (comparative example sample No. 4). Further, the following facts can be observed in Table 1. The amount of impregnation with a lubricant is increased by addition of non-magnetic particles or magnetic particles to the undercoating layer (example sample Nos. 10 and 11). The amount of impregnation with a lubricant is further increased by addition of a thermoplastic resin to the magnetic paint (example sample No. 12). The thicker the undercoating layer, the larger the amount of impregnation with a lubricant (example sample No. 14).

The same fine pores as those obtained in Example 1 were observed in this example.

Example 3

A magnetic paint composed of magnetic powder, a reinforcing agent, a binder of expoxy-phenol resin system, a solvent and an additive such as an easily thermal-decomposable additive was prepared in the same manner as in Example 1.

Figure 2:
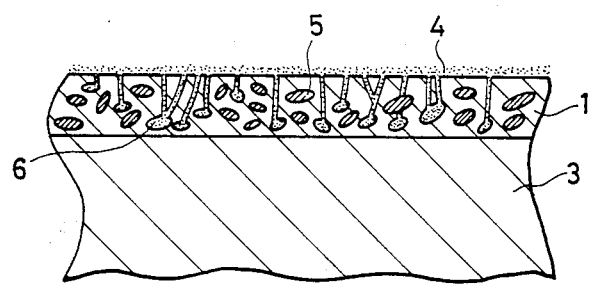

The magnetic paint thus prepared was applied on a substrate made of aluminum by spin coating to form a magnetic coating film. The magnetic coating film was dried and finally completely cured, followed by curing at such a temperature that the additive can be thermally decomposed. Thereafter, the surface of the magnetic coating film was ground and finished to have a thickness of about 0.5 μm. A predetermined amount of a lubricant (perfluoroalkylpolyether; a product of E.I. du Pont de Nemours & Co., sold under the trade name of Krytox) was applied on the surface of the magnetic layer to prepare a magnetic disk. A cross-sectional view of this magnetic disk is shown in FIG. 2. In FIGS. 1 and 2, like portions are designated by like numerals.

The amount of impregnation with a lubricant of this magnetic disk was determined by measuring the adhesion force between the magnetic head and the magnetic disk in the same manner as in Example 1.

The test results in the present example are shown in Table 3. As can be seen from Table 3, the magnetic disks formed by adding the thermal-decomposable additive to the undercoating layer were apparently superior in the amount of impregnation with a lubricant to the magnetic disk which had been formed without addition of any thermal-decomposable additive, i.e. Comparative Example 5. Particularly, as is apparent from the results with respect to example sample Nos. 17 to 20, the magnetic disks formed by adding an polyalkylene oxide exhibited a remarkably increased amount of impregnation with a lubricant. The surface of each of the magnetic disks was observed under a scanning electron microscope. As a result, it was found that the magnetic disks of comparative example sample Nos. 6 and 7 had a number of pores having a diameter of about 0.4 μm or more, which led to a high reproduction noise output.

On the other hand, the magnetic disks of example sample Nos. 17 to 20 each had a porous magnetic coating film comprising fine pores having a diameter of about 0.2 μm or less and exhibited a reproduction noise output comparable to that of the magnetic disk of comparative example No. 5 formed without addition of any thermal-decomposable additive.

TABLE 3

| sample No. of Ex. and Comp. Ex. | additive | amount of addition (wt. %) | amount of impregnation with lubricant (mg/m$^2$) |
|---|---|---|---|
| Ex. 17 | poly(butene oxide) (TERATHANE 2900; product of E.I. du Pont de Nemours & Co.) | 5 | 138 |
| Ex. 18 | poly(butene oxide) (TERATHANE 2900; product of E.I. du Pont de Nemours & Co.) | 10 | 186 |
| Ex. 19 | poly(butene oxide) TERATHANE 2900; product of E.I. du Pont de Nemours & Co.) | 30 | 245 |
| Ex. 20 | ethylene oxide/propylene oxide copolymer (PLURONIC L121, a product of Asahi Denka Kogyo K.K.) | 10 | 143 |
| Comp. Ex. 5 | — | 0 | 42 |
| Comp. Ex. 6 | liquid paraffin | 5 | 72 |
| Comp. Ex. 7 | polybutene (average MW: 550) | 5 | 65 |

The amount of addition was expressed in terms of the proportion based on the binder. Further, the amount of impregnation with a lubricant was expressed in terms of the amount of deposition of a lubricant per unit surface area of the magnetic disk.

It was confirmed that the same effect as that attained in Examples 1 and 2 through the use of $\alpha$-Fe$_2$O$_3$ or $\gamma$-Fe$_2$O$_3$ could be obtained by making use of $\alpha$-Fe$_2$O$_3$, SiO$_2$, Al$_2$O$_3$, SiC, ZrO$_2$, polymer particles, etc. as nonmagnetic particles and iron powder, $\gamma$-Fe$_2$O$_3$ containing cobalt, Fe$_3$O$_4$, Fe$_3$O$_4$ containing cobalt, barium ferrite, etc. as magnetic particles.

Further, in the above examples, a thermosetting resin of the epoxy-phenol resin system was used as the binder for the magnetic layer and the undercoating layer, and an ultraviolet- or electron beam-curable resin was used as the binder for the undercoating layer. However, it is needless to say that other kinds of thermosetting resins and ultraviolet- or electron beam-curable resins suited for attaining the purposes of the present invention can be used.

As is apparent from the foregoing detailed description, the present invention enables the production of a magnetic recording medium having a number of fine pores running from the undercoating layer to the surface of the magnetic layer and the impregnation of the fine pores with a lubricant in an amount sufficient to meet the impregnation requirement through a combination of a properly chosen thermal-decomposable additive with a heat treatment or a combination of the addition of a thermoplastic resin with an extraction treatment, which not only contributes to a remarkable improvement in the wear resistance but also makes it possible to prepare a magnetic recording medium having excellent durability and reliability which is suitable for use in high-density recording.

Further, the present invention realized the preparation of a magnetic recording medium having a number of fine pores which could not be formed by the prior art methods through the addition of a poly(alkylene oxide) to the magnetic paint, which poly(alkylene oxide) is an additive properly chosen while taking into consideration the compatibility with the binder for the magnetic coating film and the thermal decomposability meeting the requirement on the relationship with the curing temperature of the binder. The magnetic recording medium thus prepared can be impregnated with a large amount of a lubricant and exhibits reduced noises during recording and reproduction of information, which makes it possible to realize a high-density magnetic recording medium having excellent durability.

What is claimed is:

1. A magnetic recording medium comprising a substrate and a magnetic layer formed thereon which contains magnetic particles bonded to each other with a first binder containing a thermosetting resin and has a number of first fine pores impregnated with a lubricant, wherein an undercoating layer comprising a second binder containing at least one resin selected from the group consisting of a thermosetting resin, an ultraviolet-curable resin, and an electron beam-curable resin is interposed between said substrate and said magnetic layer, and said undercoating layer has a number of second fine pores which communicate with said first fine pores so that they reach the surface of said magnetic layer and is impregnated with a lubricant and wherein said first fine pores have a diameter of 0.2 μm or less and a rate of the fine pore in area of the magnetic layer of 3 to 30% and said second fine pores have a diameter of 5 μm or less and a rate of fine pore in area of the undercoating layer of 5 to 60%, said rate of the fine pore in area representing the total area of the fine pores per unit area in percentage.

2. A magnetic recording medium according to claim 1, wherein said first fine pores have a rate of the fine pore in area of 5 to 20%.

3. A magnetic recording medium according to claim 1, wherein said second fine pores have a diameter of 1 μm or less.

4. A magnetic recording medium according to claim 1, wherein said second fine pores have a rate of the fine pore in area of 10 to 30%.

5. A magnetic recording medium according to claim 1, wherein the thickness of said undercoating layer is 0.5 time or more the thickness of said magnetic layer.

6. A magnetic recording medium according to claim 1, wherein 65% or less by volume, based on said second binder, of at least one non-magnetic particle selected from the group consisting of $\alpha$-$Fe_2O_3$, $SiO_2$, $Al_2O_3$, SiC, $ZrO_2$, and a polymer particle is incorporated in said undercoating layer.

7. A magnetic recording medium according to claim 1, wherein 65% or less by volume, based on said second binder, of at least one magnetic particle selected from the group consisting of $\gamma$-$Fe_2O_3$, iron powder, $\gamma$-$Fe_2O_3$ containing cobalt, $Fe_3O_4$, $Fe_3O_4$ containing cobalt, and barium ferrite is incorporated in said undercoating layer.

8. A magnetic recording medium according to claim 1, wherein said lubricant is fluoropolyether.

9. A magnetic recording medium according to claim 1, wherein said first fine pores and said second fine pores are formed by heating a magnetic coating layer comprising said thermoplastic resin, said magnetic particles, a solvent and poly(alkylene oxide) overlying an undercoating layer comprising said at least one resin, magnetic particles, a solvent and poly(alkylene oxide) thereby causing said poly(alkylene oxide) to decompose.

10. A magnetic recording medium according to claim 9, wherein thermal decomposition temperature of the poly(alkylene oxide) is the same or lower than the curing temperature of the thermosetting resin in said magnetic paint coating layer.

* * * * *